| United States Patent [19] | [11] 3,994,837 |
|---|---|
| Kan et al. | [45] Nov. 30, 1976 |

[54] URETHANE-MODIFIED CARBODIIMIDE-ISOCYNURATE FOAMS PREPARED FROM TDI-RICH ISOCYANATES

[75] Inventors: Peter T. Kan, Plymouth; Moses Cenker, Trenton, both of Mich.

[73] Assignee: BASF Wyandotte Corporation, Wyandotte, Mich.

[22] Filed: Oct. 2, 1974

[21] Appl. No.: 511,111

[52] U.S. Cl. ............ 260/2.5 BF; 260/2.5 AT; 260/2.5 AW
[51] Int. Cl.² ............ C08G 18/12; C08G 18/14
[58] Field of Search ............ 260/2.5 BF, 2.5 AT, 260/2.5 AW

[56] References Cited
UNITED STATES PATENTS

| 3,580,868 | 5/1971 | Diehr | 260/2.5 BF |
|---|---|---|---|
| 3,772,217 | 11/1973 | Kan | 260/2.5 AW |
| 3,790,509 | 2/1974 | Diehr | 260/2.5 BF |
| 3,806,475 | 4/1974 | Narayan | 260/2.5 BF |
| 3,859,162 | 1/1975 | Johnson | 260/2.5 BF |

*Primary Examiner*—C. Warren Ivy
*Attorney, Agent, or Firm*—Bernhard R. Swick; Arnold S. Weintraub; Robert E. Dunn

[57] ABSTRACT

Rigid cellular foams characterized by carbodiimide linkages exhibit low friability and excellent flame retardancy when prepared from isocyanates rich in toluene diisocyanate. The forms hereof are prepared by the catalytic condensation of the isocyanates by using either (1) isocyanate quasi-prepolymers or (2) a two-stage process wherein isocyanate and polyol are first reacted to form a urethane-containing intermediate having free isocyanate groups and then the remaining isocyanate groups are converted to carbodiimide groups and isocyanurate groups by the catalytic condensation thereof.

11 Claims, No Drawings

URETHANE-MODIFIED CARBODIIMIDE-ISOCYNURATE FOAMS PREPARED FROM TDI-RICH ISOCYANATES

BACKGROUND OF THE INVENTION

1. Field of the Invention

The present invention relates to rigid cellular foam compositions. More particularly, the present invention relates to rigid cellular foams characterized by carbodiimide linkages. Even more particularly, the present invention pertains to rigid cellular foams characterized by carbodiimide linkages which are prepared from toluene diisocyanate-rich isocyanates.

2. Prior Art

There have been disclosed heretofore a plurality of means and methods for the preparation of rigid cellular foams characterized by carbodiimide linkages. Generally speaking, the prior art teaches the use of varying catalytic systems for initiating the isocyanate condensation reaction which characterizes the mode of preparation of these cellular products. Other prior art references teach the incorporation of various additives for altering the physical properties of the resultant foams. Thus, the prior art teaches, in this respect, the use of surfactants, blowing agents, and the like.

Exemplifying the prior art under consideration are U.S. Pat. Nos. 3,645,923; 3,806,475; 3,772,217; 3,766,103; 3,748,289; 3,732,187; etc.

However, it will be gleaned from a review of the prior art, that in instances of preparation of the present foam compositions crude methylene diphenyl diisocyanate has been the sole or major isocyanate component. The use of pure toluene diisocyanate as the sole, or major isocyanate component, on the other hand is unknown. This is because conventional one-shot foaming reactions, substituting distilled toluene diisocyanate for crude methylene diphenyl diisocyanate, provides foams which are extremely friable and very low in compressive strength. Furthermore, the inclusion of polyols into distilled toluene diisocyanate systems does not overcome the problem of friability as it does with crude methylene diphenyl diisocyanate.

The present invention, on the other hand, provides an salient solution to the problem of utilizing distilled toluene diisocyanate as the major isocyanate component in the preparation of the foams of the type under consideration.

SUMMARY OF THE INVENTION

In accordance with the present invention rigid cellular foams characterized by carbodiimide linkages are prepared from distilled toluene diisocyanate. The resulting foams possess excellent flame retardancy and low friability.

The foams hereof are prepared by either of one of two methods. The first method comprises the use of a distilled toluene diisocyanate rich isocyanate-terminated polyurethane-containing quasi-prepolymer. The quasi-prepolymers are prepared by reacting less then stoichiometric quantities of an active hydrogen-containing compound with distilled toluene diisocyanate or a mixture of distilled toluene diisocyanate and other isocyanates. After the quasi-prepolymers are prepared having a high free -NCO content they are then reacted in the presence of a carbodiimide catalyst. The catalyst can be used in admixture with a conventional urethane catalyst as well as with an isocyanurate catalyst.

In the second method hereof, a two-stage process is employed. According to this method the isocyanate and an active hydrogen-containing compound are reacted for a short period of time, optionally, in the presence of a urethane catalyst to form a urethane-containing intermediate. To this in situ formed prepolymer is then added a carbodiimide catalyst which, then, initiates the catalytic condensation reaction of the free isocyanate groups present in the intermediate.

For a more complete understanding of the present invention reference is made to the following detailed description and examples thereof.

DESCRIPTION OF THE PREFERRED EMBODIMENTS

At the outset, it is to be noted that, generally speaking, the foams prepared in accordance herewith, although containing isocyanurate and isocyanate groups, contain significant amounts of carbodiimide groups therewithin. Thus, for purposes of brevity these foams are defined herein as carbodiimide foams.

As hereinbefore noted the present invention is based on the discovery that distilled toluene diisocyanate can now be used as the isocyanate component in the preparation of rigid cellular foams characterized by carbodiimide linkages by the catalytic condensation thereof. The foams hereof have low friability and excellent flame retardancy.

The discovery of the use of distilled toluene diisocyanate, i.e., a 99% pure distilled 80:20 weight ratio mixture of 2,4- and 2,6-toluene diisocyanate, hereinafter referred to as TDI, was unexpected in that the use of distilled TDI in conventional carbodiimide formation reactions provided foams of high friability and low compressive strength. Furthermore, and as noted hereinbefore, the addition of polyols or other active hydrogen-containing compounds as additives, fails to overcome this deficiency. The present processes are based on the fact that the urethane reaction is much slower than carbodiimide formation or isocyanate trimerization. This discrimination is overcome by permitting the urethane groups to be pre-formed. This, also, inhibits and reduces the degree of trimer formation, the trimer normally contributing to the friability problem. Moreover, by the processes hereof, there is, also, introduced into the foams pre-formed urethane groups which, also, contribute to lower friability of the carbodiimide foams hereof.

The use of "pure or distilled" TDI in the formation of carbodiimide provides other advantages in that the aromaticity achieved by isocyanurate formation, as a result of isocyanate trimerization, improves flame retardancy.

In accordance herewith the carbodiimide foams hereof are prepared from a major amount, i.e., more than 50%, by weight, of distilled TDI, by the catalytic condensation thereof. Two processes for achieving the present invention are advantageously deployed. The first method hereof contemplates the condensation reaction of an isocyanate-terminated quasi-prepolymer in the presence of a carbodiimide catalyst. The second method hereof comprises a two-stage process of (a) reacting an isocyanate and an active hydrogen-containing compound, optionally, in the presence of a urethane catalyst to form a urethane-containing intermediate having free isocyanate groups, and, then, (b) converting the remaining isocyanate groups of the intermediate to carbodiimide and isocyanurate groups.

For purposes of clarity, these two processes will be dealt with separately.

A. QUASI-PREPOLYMER METHOD

The quasi-prepolymer method hereof contemplates the preparation of an isocyanate-terminated quasi-prepolymer from the reaction of active hydrogen-containing compounds and isocyanates having a major amount of distilled TDI. This is followed by the conversion of the remaining isocyanate groups to carbodiimide and isocyanurate groups, as well as, urethane groups, using suitable catalysts therefor.

The quasi-prepolymers employed herein are isocyanate-terminated quasi-prepolymers having a major amount of distilled TDI as the isocyanate component. These pre-polymers are prepared by reacting less than stoichiometric quantities of an active hydrogen-containing compound with the isocyanate, optionally, in the presence of a urethane catalyst. The reaction generally proceeds at a temperature ranging from about 20° C to about 70° C for a period of time ranging from about one to two hours.

Suitable active hydrogen-containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxy-terminated polyurethane polymers, polyhydric polythioethers, alkylene oxide adducts of phosphorous-containing acids, polyacetals, aliphatic polyols, aliphatic thiols including alkane, alkene and alkyne thiols having two or more -SH groups; as well as mixtures thereof. Compounds which contain two or more different groups within the above-defined classes may also be used such as, for example, compounds which contain one —SH group and one —OH group.

Any suitable hydroxyl-containing polyester may be used such as are obtained, for example, from polycarboxylic acids and polyhydric alcohols. Any suitable polycarboxylic acid may be used, such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, butyl-α-ethyl-glutaric acid, α,β-diethyl-succinic acid, isophthalic acid, terephthalic acid, hemimellitic acid, and 1,4-cyclohexane-dicarboxylic acid. Any suitable polydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylol-propane, 1,1,1-trimethylolethane hexane-1,2,6-triol, α-methyl glucoside, pentaerythritol, and sorbitol. Also included within the term "polyhydric alcohol " are compounds derived from phenol such as 2,2-bis(4-hydroxyphenyl)propane, commonly known as Bisphenol A.

Any suitable polyalkylene ether polyol may be used such as the polymerization product of an alkylene oxide or of an alkylene oxide with a polyhydric alcohol. Any suitable polyhydric alcohol may be used such as those disclosed above for use in the preparation of the hydroxyl-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran, alkylene oxide tetrahydrofuran mixtures; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from 2 to 6 carbon atoms such as polyethylene ether glycols, polypropylene ether glycols, and polybutylene ether glycols. The polyalkylene polyether polyols may be prepared by any known process such as, for example, the process disclosed by Wurtz in 1,859 and Encyclopedia of Chemical Technology, vol 7, pp. 257–262, published by Interscience Publishers, Inc. (1957) or in U.S. Pat. No. 1,992,459.

Any suitable polyhydric polythioether may be used such as, for example, the condensation product of thiodiglycol or the reaction product of a dihydric alcohol such as is disclosed above for the preparation of the hydroxyl-containing polyesters with any other suitable thioether glycol.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above, or they may be made using the same components that make up the hydroxyl-containing polyester with only a portion of the components being a diamine such as ethylene diamine.

Alkylene oxide adducts of acids of phosphorus which may be used include those neutral adducts prepared from the alkylene oxides disclosed above for use in the preparation of polyalkylene polyether polyols. Acids of phosphorus which may be used are acids having a $P_2O_5$ equivalency of from about 72% to about 95%. The phosphoric acids are preferred.

Any suitable polyacetal may be used such as, for example, the reaction product of formaldehyde or other suitable aldehyde with a dihydric alcohol or an alkylene oxide such as those disclosed above.

Any suitable aliphatic thiol including alkane thiols containing at least two —SH groups may be used such as 1,2-ethane dithiol, 1,2-propane dithiol, 1,3-propane dithiol, and 1,6-hexane dithiol; alkene thiols such as 2-butene-1, 4-dithiol; and alkyne thiols such as 3-hexyne-1,6-dithiol.

Other compounds which do not necessarily fit within any of the previously set forth classes of compounds which are quite suitable in the production of these other quasi-prepolymer compounds include the hydroxy-terminated polyurethane polymers such as a hydroxy-terminated polymer made by reacting the isocyanate with several moles of an alkylene glycol.

Within the broad class of useful active hydrogen compounds, a particularly preferred compound is the triol derived from the condensation of phenol, formaldehyde, diethanolamine, and propylene oxide, such as that sold by Jefferson Chemical under the name THANOL R-350X.

The isocyanate used in the formation of the instant quasi-prepolymer, as noted, comprises a major amount, i.e., greater than fifty percent, by weight, of distilled TDI. Thus, the isocyanate can be used, alone, or in admixture with other organic isocyanates.

Representative of the organic polyisocyanates which can be used in admixture with the distilled TDI can be represented by the formula:

R(NCO)$_z$ wherein R is a polyvalent organic radical selected from the group of aliphatic, aromatic, arylalkyl and alkylaryl organic radicals as well as mixtures thereof; and Z is an integer corresponding to the valence number of R and is at least 2. Representative of the organic polyisocyanates contemplated herein includes, for example, the aromatic diisocyanates, such as 2,4-toluene diisocyanate, 2,6-toluene diisocyanate and mixtures of 2,4- and 2,6-toluene diisocyanate, to change the isomer ratio in the distilled TDI, crude toluene diisocyanate, methylene diphenyl diisocyanate, crude methylene diphenyl diisocyanate and the like; the aromatic triisocyanates such as 4,4',4''-triphenylmethylene triisocyanate, 2,4,6-toluene triisocyanate; the aromatic tetraisocyanates, such as 4,4'-dimethyldiphenylmethane-2,2',5,5'-tetraisocyanate, and the like; aralkyl polyisocyanates, such as xylylene diisocyanate; aliphatic polyisocyanates, such as hexamethylene-1,6-diisocyanate, lysine diisocyanate methylester and the like, and mixtures thereof. Other useful organic polyisocyanates include:
  polymethylene polyphenylisocyanate,
  hydrogenated methylene diphenylisocyanate,
  m-phenylene diisocyanate,
  naphthylene-1,5-diisocyanate,
  1-methoxyphenyl-2,4-diisocyanate,
  diphenylmethane-4,4'-diisocyanate,
  4,4'-biphenylene diisocyanate,
  3,3'-diemthoxy-4,4'-biphenyl diisocyanate,
  3,3'-dimethyl-4,4'-biphenyl diisocyanate, and
  3,3'-dimethyldiphenylmethane-4,4'-diisocyanate,
and the like.

These polyisocyanates are prepared by conventional methods in the art such as the phosgenation of the corresponding organic amine.

Still another class of organic polyisocyanates useful herein are other isocyanate-terminated quasi-prepolymers. These other quasi-prepolymers are prepared by reacting excess organic polyisocyanate or mixtures thereof with a minor amount of an active hydrogen-containing compound, such as those enumerated hereinbefore.

In preparing the quasi-prepolymers hereof it is preferred to use the TDI as a mixture thereof with crude methylene diphenyl diisocyanate. Such a mixture optimally comprises from about 70 to 90%, by weight, of TDI and from about 10 to 30% by weight of crude methylene diphenyl diisocyanate.

The quasi-prepolymer, as noted, is prepared by admixing the TDI or mixture thereof with the active hydrogen-containing compound under the reaction conditions set forth above, and, preferably, in an inert atmosphere, and in the presence or absence of a urethane catalyst, depending on the reactivity of the active hydrogen compound toward the isocyanate.

In preparing the quasi-prepolymer, it is preferred that it have a free isocyanate content of from about 20 to 40% and, preferably, from about 25 to 40%.

After the quasi-prepolymer is formed, it is then reacted, under suitable conditions, to prepare the carbodiimide foams hereof.

The carbodiimide foams hereof are prepared by reacting the pure TDI-rich quasi-prepolymer in the presence of a catalytically sufficient amount of a co-catalyst system comprising a carbodiimide catalyst and an isocyanate trimerization catalyst. Additionally, a urethane catalyst is, optionally, employed depending on the rate of reactivity of the active hydrogen compound with the isocyanate.

Where utilized, the co-catalyst system is employed in a weight ratio to urethane catalyst of from about 1:1 to about 6:1, and preferably, from about 2:1 to about 4:1. Also, the carbodiimide catalyst and isocyanate trimerization catalyst are employed in a, respective, weight ratio of from about 7:1 to 1:7, and, preferably, from about 3:1 to about 5:1.

Useful carbodiimide catalysts include those described in U.S. Pat. Nos. 3,806,475, 3,645,923, 3,824,240, and 3,824,239, the disclosures of which are hereby incorporated by reference. Other useful catalysts are disclosed in U.S. Pat. application Ser. No. 118,994, the disclosure of which is, also, incorporated by reference. Thus, any known carbodiimide catalyst can be used herein.

The useful isocyanate trimerization catalysts contemplated herein, are, also, any of the well-known isocyanate trimerization catalysts. Thus, the trimerization catalysts disclosed in U.S. Pat. Nos. 3,766,103; 3,723,366, and U.S. Pat. No. 3,717,596 are efficaciously deployed herein.

A particularly preferred co-catalyst system comprises 2,4-bis(diethylamino)-6-(N-methylethanolamino)-s-triazine (DMT) as the carbodiimide catalyst and 1,3,5-tris(3-dimethylaminopropyl)-s-hexahydrotriazine as the trimerization catalyst.

Any suitable urethane catalyst can be used herein, such as tertiary amines and metallo-organic salt catalysts which are polyvalent metal salts of an organic acid having up to about eighteen carbon atoms and being void of active hydrogen atoms. The organic portion of salt may be either linear or cyclic, saturated or unsaturated. The polyvalent metal has a valence of from about two to four.

Representative tertiary amines include, for example, diethylene triamine ketimine, tetramethylethylene diamine, triethylene diamine, tetramethylbutane diamine, tetramethyl guanidine, trimethyl piperazine and the like.

Typical organo-metallic salt catalysts include stannous acetate, stannous butyrate, stannous 2-ethylhexoate, stannous laurate, stannous oleate, stannous stearate, lead cyclopentane carboxylate, cadmium cyclohexane carboxylate, lead naphthenate, lead octoate, cobalt naphthenate, zinc naphthenate, bis(phenyl mercury)dodecyl succinate, phenyl mercuric benzoate, cadmium naphthenate, dibutyltin dilaurate, dibutyltin diacetate, and dibutyltin-di-2ethylhexoate.

Generally, the catalyst is employed in an amount ranging from about 0.5 to about 15 parts, by weight, based on the weight of the active hydrogen-containing compound, and, preferably, from about 5 to 15 parts by weight, based on 100 parts by weight of the active hydrogen-containing compound.

The carbodiimide foams are prepared by admixing the ingredients together and stirring the mixture at a temperature of about 25° C. At this temperature the condensation reaction commences.

B. THE TWO STEP PROCESS

In accordance with the second method a carbodiimide foam is prepared from distilled TDI by a process comprising:

1. reacting an excess amount of distilled TDI or a mixture thereof with an active hydrogen-containing compound in the presence or absence of a urethane catalyst to form essentially an in situ quasi-prepolymer or a urethane-containing intermediate having free isocyanate groups, and then
2. adding to the product of (1) a co-catalyst system comprising a carbodiimide catalyst and an isocyanate trimerization catalyst.

In carrying out this process, the isocyanate, active hydrogen compound and the urethane catalyst, if present, are mixed together and reacted for a short period of time ranging from about two to ten minutes. This time will vary depending upon the reactivity of the active hydrogen compound with the reactive isocyanate groups. But, generally the reaction is complete in about from two to ten minutes. The mixing together of the ingredients provides a homogeneous mixture which forms an exotherm spontaneously.

After the reaction is completed the co-catalyst system is added thereto and admixed therewith and foam formation commences shortly thereafter.

It should be noted that in the first step of the process, the urethane catalyst may be excluded if the inter-reactivity between the isocyanate and active hydrogen compound is sufficiently great.

Also, it should be noted that any of the useful compounds enumerated with respect to the quasi-prepolymer method are equally applicable herein.

With respect to the preparation of the carbodiimide foams hereof by either of the within described processes, it is further contemplated that additional ingredients be incorporated into the foam formulation to tailor the properties thereof. Thus, plasticizers, such as tris(2-chloroethyl) phosphate; surfactants, such as the silicone surfactants, e.g., alkylpolysiloxanes and polyalkyl siloxanes; active hydrogen-containing compounds, such as those hereinbefore enumerated, can be employed in the practice hereof. Further, additional ingredients include auxiliary or supplemental blowing agents, such as water or halohydrocarbons, inorganic fillers, pigments and the like.

The additional ingredients can be added herein by any suitable technique, such as that disclosed in any of the hereinbefore noted prior art.

In any event, the carbodiimide foams hereof are rigid cellular products containing, additionally, isocyanurate and urethane groups therewithin. The foams produced hereby have a density of from about one to three pounds per cubic foot. The foams hereof exhibit low friability, excellent flame retardancy and compressive strength.

Following are specific, non-limiting examples of the present invention. In the examples, which are illustrative of the principles set forth herein, all parts are by weight absent indications to the contrary.

EXAMPLE I

The following example illustrates the preparation of an isocyanate-terminated quasi-prepolymer from pure TDI in accordance with the present invention:

Into a suitable reaction vessel equipped with stirring means was charged 100 parts of an isocyanate containing a major amount of pure TDI. With stirring and under a nitrogen blanket was slowly added to the isocyanate, an active hydrogen containing compound. The temperature in the vessel was permitted to rise spontaneously until the maximum exotherm temperature was reached. At the end of the addition the stirring of the mixture was continued until the temperature in the vessel reached room temperature.

Table I, below, sets forth the ingredients, reaction temperatures and times, as well as the free isocyanate content of the quasi-prepolymers prepared hereby.

TABLE I

| | Charge, parts by weight | | | Reaction Temp. | Product % |
|---|---|---|---|---|---|
| | Isocyanate | | | | |
| Sample | TDI | CMDI[1] | Polyol[2] | °C/Time,hr. | NCO |
| 1 | 90 | 10 | 10 | 24–50/1.5 | 37.8 |
| 2 | 90 | 10 | 15 | 23–59/1.0 | 34.9 |
| 3 | 90 | 10 | 20 | 23–67/1.5 | 29.7 |
| 4 | 80 | 20 | 10 | 25–50/1.2 | 36.4 |
| 5 | 80 | 20 | 15 | 24–62/1.1 | 32.2 |
| 6 | 80 | 20 | 20 | 24–70/1.5 | 29.3 |
| 7 | 70 | 30 | 10 | 24–50/1.5 | 34.9 |
| 8 | 70 | 30 | 15 | 23–59/1.0 | 31.4 |
| 9 | 70 | 30 | 20 | 23–67/1.5 | 26.5 |

[1] crude methylene diphenyldiisocyanate
[2] a triol derived from phenol, formaldehyde, diethanolamine and propylene oxide sold by Jefferson Chemical under the name THANOL R-350X

EXAMPLE II

Using the quasi-prepolymers of Example I, a plurality of rigid cellular foams characterized by carbodiimide linkages were prepared by adding thereto a co-catalyst system of a carbodiimide catalyst and an isocyanate trimerization catalyst. Additionally, a urethane catalyst was employed.

Pre-mixed with the catalysts were a plasticizer, surfactant and halohydrocarbon blowing agent.

The foams were prepared by charging the prepolymers into a suitable vessel equipped with stirring means. With agitation the catalyst mixtures were added to the pre-polymers and the resulting mixture was stirred at 25° C, the initiation temperature. At the initiation temperature foam formation commenced, as evidenced by the evolution of carbon dioxide and foam formation in the vessel.

The following table, Table II, sets forth the ingredients used to prepare the foams and the resulting physical properties. The compressive strength was determined by ASTM D-1621; tumbling friability by ASTM C-421; and the Bulter Chimney test by ASTM D-3014.

TABLE II

| Sample | DMT[1] | Urethane Catalyst[2] | TDH[3] | Plasticizer[4] | Surfactant[5] | Blowing agent[6] | Den., pcf. | Comp. Str. 10% Def. psi. | Tumb. Friab. % Wt. Loss | Closed Cell Cont. % | Bulter Chimney Test | | |
|---|---|---|---|---|---|---|---|---|---|---|---|---|---|
| | | | | | | | | | | | % Wt. Ret. | Flame Ht. in. | Time to Sx[7] sec. |
| 1 | 2 | 1 | 0.5 | 1 | 0.5 | 8 | 2.17 | 29 | 36 | 99 | 88 | 8 | 10 |
| 4 | 2 | 2 | 1 | 2 | 1 | 10 | 1.84 | 21 | 39 | 98 | 90 | 7 | 10 |
| 5 | 4 | 2 | 1 | 2 | 1 | 12 | 2.31 | 35 | 16 | 99 | 87 | 9 | 11 |
| 6 | 4 | 2 | 1 | 2 | 1 | 18 | 1.96 | 26 | 14 | 98 | 84 | 8 | 11 |

TABLE II-continued

| Sample | DMT[1] | Urethane Catalyst[2] | TDH[3] | Plasti- cizer[4] | Surfac- tant[5] | Blowing agent[6] | Den., pcf. | Comp. Str. 10% Def. psi. | Tumb. Friab. % Wt. Loss | Closed Cell Cont. % | Butler Chimney Test | | |
|---|---|---|---|---|---|---|---|---|---|---|---|---|---|
| | | | | | | | | | | | % Wt. Ret. | Flame Ht. in. | Time to Sx[7] sec. |
| 7 | 3 | 2 | 1 | 2 | 1 | 12 | 1.93 | 24 | 30 | 99 | 90 | 7 | 10 |
| 7 | 3 | 2 | 1 | 2 | 1 | 15 | 1.78 | 26 | 32 | 99 | 90 | 7 | 10 |
| 8 | 3 | 2 | 1 | 2 | 1 | 15 | 2.05 | 31 | 20 | 98 | 83 | 9 | 10 |
| 9 | 4 | 2 | 1 | 2 | 1 | 20 | 1.97 | 24 | 11 | 97 | 88 | 8 | 11 |

[1] 2,4-bis(diethylamino)-6-(N-methylethanolamino)-s-triazine
[2] dibutyltin dilaurate
[3] 1,3,5-tris(3-dimethylaminopropyl)-s-hexahydrotriazine
[4] tris(2-chloroethyl) phosphate
[5] silicone surfactant sold by Dow Corning under the name DC-193
[6] stabilized fluorotrichloromethane
[7] self-extinguishment

EXAMPLE III

This example illustrates the preparation of a carbodiimide foam by the two-step process hereof.

Into a suitable reaction vessel equipped with agitation means was added 100 parts of an isocyanate containing a major amount of pure TDI. To this charge was then added, with stirring, a predetermined amount of an active hydrogen-containing compound, in the presence or absence of a urethane catalyst. The liquid mixture developed an exotherm spontaneously. The mixture was stirred for about two to four minutes, and then allowed to cool to room temperature. To the mixture was then added, with stirring, the carbodiimide catalyst, isocyanate trimerization catalyst and other additional ingredients. Within ten to fifteen seconds after the addition, the foam formation was essentially completed.

The following table, Table III, sets forth the ingredients and physical properties of the carbodiimide foams produced in accordance herewith. The physical properties were determined by the test procedures described in Example II.

EXAMPLE IV

Following the procedure of Example I, a series of isocyanate-terminated quasi-prepolymers were prepared using a major amount of pure TDI. The isocyanate was reacted with amounts ranging from 5 to 25 parts of a high molecular weight acrylonitrile-styrene grafted polyol.

These quasi-prepolymers were then used to prepare carbodiimide foams using the procedure set forth in Example II.

The following table, Table IV, sets forth the ingredients and amounts thereof used to prepare this series of quasi-prepolymers:

TABLE IV

| | Ingredients, pbw | | |
|---|---|---|---|
| Sample | TDI | CMDI | POLYOL |
| 30 | 100 | — | 5 |
| 31 | 100 | — | 5 |
| 32 | 100 | — | 15 |
| 33 | 100 | — | 20 |
| 34 | 100 | — | 25 |
| 35 | 90 | 10 | 5 |

TABLE III

| Sample | TDI | CMDI[1] | Poly- ol[2] | Ure- thane Cata- lyst[3] | DMT[4] | TDH[5] | Plasti- cizer[6] | Surfac- Tant[7] | Blowing Agent[8] | Den. pcf. | Comp. Str. 10% Def. psi. | Tumb Friab. % Wt. Loss | Butler Chimney Test | | |
|---|---|---|---|---|---|---|---|---|---|---|---|---|---|---|---|
| | | | | | | | | | | | | | Closed Cell Cont. % | Wt. Ret. % | Flame Ht. in. |
| 10 | 100 | — | 5 | 2 | 2 | 1 | 2 | 1 | — | 1.9 | 16 | 45 | 3 | 77 | 10 |
| 11 | 100 | — | 10 | 2 | | 1 | | | 2 | 2.2 | 19 | 35 | 2 | 66 | 10 |
| 12 | 100 | — | 15 | 1 | | 1 | | | 6 | 2.6 | 40 | 22 | 5 | 79 | 10 |
| 13 | 100 | — | 20 | — | | 2 | | | 10 | 2.4 | 37 | 21 | 100 | 87 | 10 |
| 14 | 100 | — | 25 | — | | 3 | | | 16 | 2.2 | 36 | 20 | 99 | 35 | 10 |
| 15 | 90 | 10 | 5 | 2 | | 1 | | | — | 2.2 | 19 | 41 | 32 | 88 | 10 |
| 16 | 90 | 10 | 10 | 2 | | 1 | | | 3 | 2.4 | 27 | 34 | 3 | 73 | 10 |
| 17 | 90 | 10 | 15 | 2 | | 1 | | | 8 | 2.3 | 34 | 32 | 80 | 83 | 10 |
| 18 | 90 | 10 | 20 | — | | 2 | | | 12 | 2.3 | 39 | 23 | 101 | 85 | 9 |
| 19 | 90 | 10 | 25 | — | | 2 | | | 18 | 2.4 | 42 | 22 | 101 | 60 | 10 |
| 20 | 80 | 20 | 5 | 2 | | 1 | | | 1 | 2.2 | 22 | 45 | 4 | 89 | 7 |
| 21 | 80 | 20 | 10 | 2 | | 1 | | | 8 | 2.1 | 25 | 37 | 86 | 72 | 10 |
| 22 | 80 | 20 | 15 | 2 | | 2 | | | 12 | 2.2 | 26 | 21 | 98 | 86 | 9 |
| 23 | 80 | 20 | 20 | 2 | | 2 | | | 16 | 2.2 | 28 | 21 | 99 | 89 | 8 |
| 24 | 80 | 20 | 25 | — | | 2 | | | 22 | 2.3 | 43 | 18 | 98 | 66 | 10 |
| 25 | 70 | 30 | 5 | 2 | | 1 | | | 3 | 2.3 | 27 | 48 | 48 | 90 | 9 |
| 26 | 70 | 30 | 10 | 2 | | 1 | | | 10 | 2.3 | 39 | 39 | 101 | 87 | 9 |
| 27 | 70 | 30 | 15 | 2 | | 2 | | | 14 | 2.2 | 39 | 23 | 100 | 90 | 7 |
| 28 | 70 | 30 | 20 | 2 | | 2 | | | 18 | 2.4 | 39 | 22 | 100 | 89 | 8 |
| 29 | 70 | 30 | 25 | — | | 1 | | | 22 | 2.8 | 50 | 17 | 100 | 90 | 8 |

[1] crude methylene diphenyl diisocyanate
[2] Thanol R 356-X
[3] 2,4-bis(diethylamino)-6-(N-methylethanolamino)-s-triazine
[4] dibutyltin dilaurate
[5] 1,3,5-tris(3-dimethylaminopropyl)-s-hexahydrotriazine
[6] tris(2-chloroethyl) phosphate
[7] silicone surfactant sold by Dow Corning under the name DC-193
[8] stabilized fluorotrichloromethane

TABLE IV-continued

| | Ingredients, pbw | | |
|---|---|---|---|
| Sample | TDI | CMDI | POLYOL |
| 36 | 90 | 10 | 10 |
| 37 | 90 | 10 | 15 |
| 38 | 90 | 10 | 20 |
| 39 | 90 | 10 | 25 |
| 40 | 80 | 20 | 5 |
| 41 | 80 | 20 | 10 |
| 42 | 80 | 20 | 10 |
| 43 | 80 | 20 | 15 |
| 44 | 80 | 20 | 20 |

The following table, Table V, sets forth the ingredients and amounts thereof used to prepare carbodiimide foams from the quasi-prepolymers. Table V also sets forth the physical properties of the resulting foams.

TABLE V

| | QUASI-PREPOLYMER | | | | | | | | | | Butler Chimney Test | | |
|---|---|---|---|---|---|---|---|---|---|---|---|---|---|
| Sample | Amt. | Urethane Catalyst[1] | DMT[2] | TDH[3] | Plasti-cizer[4] | Surfac-tant[5] | Blowing Agent[6] | Den. pcf. | Closed Cell Cont. % | Tumb. Friab. % Wt. Loss | Wt. Ret. % | Flame Ht. in. | Time To Sx Sec. |
| 30 | 105 | 0.3 | 1 | 0.3 | 1 | 0.5 | — | 1.7 | 7 | 48 | 70 | 10 | 19 |
| 31 | 105 | 0.3 | 2 | 0.3 | | 0.5 | — | 1.1 | 6 | 33 | 51 | 10 | 20 |
| 32 | 115 | 1 | 4 | 1 | | 2 | 10 | 2.4 | 2 | 69 | 55 | 10 | 22 |
| 33 | 120 | 0.5 | 4 | 2 | | | 20 | 2.5 | 2 | 55 | 53 | 10 | 32 |
| 34 | 125 | 1 | 4 | 3 | | | 15 | 2.2 | 3 | 59 | 41 | 10 | 32 |
| 35 | 105 | 0.5 | 1 | 1 | | | — | 1.9 | 14 | 31 | 80 | 10 | 14 |
| 36 | 110 | 0.5 | 2 | 1 | | | 15 | 2.5 | 4 | 40 | 78 | 10 | 18 |
| 37 | 115 | 1 | 3 | 2 | | | 10 | 2.3 | 3 | 77 | 44 | 10 | 75 |
| 38 | 120 | 1 | 4 | 3 | | | 10 | 2.6 | 2 | 53 | 47 | 10 | 44 |
| 39 | 125 | 1 | 5 | 3 | | | 15 | 2.2 | 3 | 57 | 41 | 10 | 37 |
| 40 | 105 | 0.5 | 2 | 2 | | | — | 2.3 | 8 | 26 | 78 | 10 | 23 |
| 41 | 110 | 1 | 4 | 3 | | | 5 | 2.7 | 3 | 48 | 72 | 10 | 21 |
| 42 | 110 | 1 | 4 | 3 | | | 12 | 1.9 | 2 | 86 | 47 | 10 | 36 |
| 43 | 115 | 1 | 4 | 5 | | | 12 | 2.0 | 2 | 80 | 47 | 10 | 32 |
| 44 | 120 | 1 | 5 | 5 | ↓ | ↓ | 15 | 2.1 | 3 | 63 | 45 | 10 | 33 |

[1]dibutyltin dilaurate
[2]2,4-bis(diethylamino)-6-(N-methylethanolamino)-s-triazine
[3]1,3,5-tris(3-dimethylaminopropyl)-s-hexahydrotriazine
[4]tris(2-chloroethyl) phosphate
[5]silicone surfactant sold by Dow Corning under the name DC-193
[6]stabilized fluorotrichloromethane

EXAMPLE V

This example provides a comparison between the quasi-prepolymer process hereof and the conventional one-shot process normally deployed in the preparation of carbodiimide foams, such as that described in any of the hereinbefore referenced prior art patents.

To provide a proper comparison, the one-shot method was conducted using the same amount and same ingredients as set forth in Examples I and II with respect to samples 4–6. The results of this comparison are set forth below in Table VI; wherein samples 4'-6' correspond to the ingredients and amounts of samples 4-6, respectively, but wherein the foams prepared from samples 4'-6' were prepared by the one-shot method.

TABLE VI

| | Sample | Den., pcf. | Compr. Str.,10% def.,psi | Tumb. Friab.% wt.loss | Butler Chimney % Wt. Ret. |
|---|---|---|---|---|---|
| A. One Shot | | | | | |
| | 4' | 2.1 | 20 | 59 | 75 |
| | 5' | 2.2 | 17 | 61 | 45 |
| | 6' | 2.0 | 20 | 62 | 35 |
| B. Quasi-Prepolymer | | | | | |
| | 4 | 1.8 | 21 | 39 | 90 |
| | 5 | 2.3 | 35 | 16 | 87 |
| | 6 | 2.0 | 26 | 14 | 84 |

From the data, it is apparent that carbodiimide foams containing a major amount of distilled TDI as the isocyanate component exhibit inherently improved properties when utilizing the quasi-prepolymer method, as contrasted with the conventional one-shot process.

Moreover, from a review of the examples it is readily appreciated that the present invention provides a solution to the problem of utilizing pure TDI as the major isocyanate component in the preparation of carbodiimide foams. The present invention enables the use of pure TDI to provide urethane-modified foams having excellent flame retardancy and weight retention, while obviating the problems of high friability normally attendant distilled TDI-based foams.

Having thus described the invention, what is desired to claim and secure by Letters Patent is:

1. A process for utilizing a major amount of 99% pure distilled 80:20 weight ratio mixture of 2,04- and 2, 6- toluene diisocyanate in the preparation of rigid cellular foams characterized by carbodiimide linkages, comprising:
   a. reacting the distilled toluene diisocyanate with less than stoichiometric quantities of a polyol to form a urethane-containing isocyanate-terminated quasi-prepolymer having from about 20 to 40 percent of free isocyanate, and
   b. catalytically condensing the quasi-prepolymer in the presence of a catalytically sufficient amount of a co-catalyst system comprising a catalyst which promotes the formation of carbodiimide linkages and a catalyst which promotes isocyanate trimerization.

2. The process of claim 1 wherein the carbodiimide catalyst is used in admixture with a urethane forming catalyst.

3. The process of claim 1 wherein the distilled toluene diisocyanate is used in admixture with an additional organic polyisocyanate corresponding to the formula:

wherein R is a polyvalent organic radical selected from the group consisting of aliphatic and aromatic hydrocarbon organic radicals, as well as mixtures thereof; and Z is an integer corresponding to the valence number of R and is at least 2, the distilled toluene diisocyanate being present in an amount greater than 50 percent, by weight, in the admixture.

4. The process of claim 3 wherein the additional organic polyisocyanate is crude methylene diphenyl diisocyanate.

5. The process of claim 1 wherein the quasi-prepolymer has a free isocyanate content of from about 25 to 40%.

6. A process for utilizing a major amount of 99% weight ratio mixture 2, 4- and 2, 6- toluene diisocyanate in the preparation of rigid cellular foams characterized by carbodiimide linkages, comprising:
 a. reacting together for a period of about two to ten minutes (1) an excess amount of the toluene diisocyanate and (2) a polyol to form a urethane-containing intermediate, and
 b. adding to the intermediate a co-catalyst system comprising a catalyst which promotes the formation of carbodiimide linkages and a catalyst which promotes isocyanate trimerization.

7. The process of claim 6 wherein the toluene diisocyanate and the polyol are reacted together in the presence of a urethane catalyst.

8. The process of claim 7 wherein the distilled toluene diisocyanate is admixed with an additional organic polyisocyanate corresponding to the formula:
$$R(NCO)_z$$
wherein R is a polyvalent organic radical selected from the group of aliphatic and aromatic hydrocarbon organic radicals, as well as mixtures thereof; and Z is an integer corresponding to the valence number of R and is at least 2, the distilled toluene diisocyanate being present in an amount greater than 50 percent, by weight, of the admixture.

9. A urethane-modified rigid cellular foam characterized by carbodiimide linkages prepared in accordance with the process of claim 8.

10. A urethane-modified rigid cellular foam characterized by carbodiimide linkages prepared in accordance with the process of claim 7.

11. A urethane-modified rigid cellular foam characterized by carbodiimide linkages prepared in accordance with the process of claim 1.

* * * * *

UNITED STATES PATENT AND TRADEMARK OFFICE
CERTIFICATE OF CORRECTION

PATENT NO. : 3,994,837
DATED : November 30, 1976
INVENTOR(S) : Peter T. Kan and Moses Cenker It is certified that error appears in the above—identified patent and that said Letters Patent are hereby corrected as shown below:

First page, in the Title [54], line 2, "ISOCYNURATE" should read ---ISOCYANURATE---.

Column 1, in the Title, line 3, "ISOCYNURATE" should read ---ISOCYANURATE---.

Column 4, line 14, the year "1,859" should be ---1859---.

Column 12, line 42, "2,04-" should read ---2,4- ---.

Signed and Sealed this

Fifth Day of April 1977

[SEAL]

Attest:

RUTH C. MASON
*Attesting Officer*

C. MARSHALL DANN
*Commissioner of Patents and Trademarks*